(12) United States Patent
Stafeil et al.

(10) Patent No.: US 11,261,348 B2
(45) Date of Patent: Mar. 1, 2022

(54) LABEL CONSTRUCTION FOR ABLATIVE LASER MARKING

(71) Applicant: Brady Worldwide, Inc., Milwaukee, WI (US)

(72) Inventors: Kevin J. Stafeil, Delafield, WI (US); Jon E. Dable, Cudahy, WI (US); Ellen M. Stieber, Greenfield, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 421 days.

(21) Appl. No.: 16/354,541

(22) Filed: Mar. 15, 2019

(65) Prior Publication Data
US 2019/0284440 A1 Sep. 19, 2019

Related U.S. Application Data

(60) Provisional application No. 62/644,304, filed on Mar. 16, 2018.

(51) Int. Cl.
*C09J 7/25* (2018.01)
*C09J 7/20* (2018.01)
(Continued)

(52) U.S. Cl.
CPC ........... *C09J 7/255* (2018.01); *B23K 26/0006* (2013.01); *B23K 26/36* (2013.01); *C09J 7/201* (2018.01);
(Continued)

(58) Field of Classification Search
CPC ..... C09J 7/255; C09J 7/201; C09J 7/29; C09J 11/04; C09J 2203/334; C09J 2301/41;
(Continued)

(56) References Cited

U.S. PATENT DOCUMENTS 5,256,506 A * 10/1993 Ellis .................. B41M 5/24
346/135.1
6,057,067 A 5/2000 Isberg et al.
(Continued)

FOREIGN PATENT DOCUMENTS

CN 101835625 A 9/2010
JP S63175987 A 7/1988
(Continued)

OTHER PUBLICATIONS

PCT International Search Report and Written Opinion, PCT/US2019/22461, dated Jul. 23, 2019, 22 pages.
(Continued)

*Primary Examiner* — Patricia L. Nordmeyer
(74) *Attorney, Agent, or Firm* — Quarles & Brady LLP

(57) ABSTRACT

A label has a topcoat layer and a sacrificial layer. The topcoat layer has a first color having a first L-value and the sacrificial layer has a second color having a second L-value. The topcoat layer comprises at least one reflective pigment and a polymeric binder and the sacrificial layer comprises at least one infrared (IR) absorbing material and a polymeric binder. The first L-value is greater than the second L-value, and the total amount of the at least one reflective pigment is from 40 wt % to 80 wt %, based on the weight of the topcoat layer.

23 Claims, 11 Drawing Sheets

(51) Int. Cl.
  *B23K 26/36* (2014.01)
  *B23K 26/00* (2014.01)
  *G09F 3/00* (2006.01)
  *G09F 3/10* (2006.01)
  *G09F 3/02* (2006.01)
  *C09J 11/04* (2006.01)
  *C09J 7/29* (2018.01)

(52) U.S. Cl.
  CPC .............. *C09J 7/29* (2018.01); *C09J 11/04* (2013.01); *G09F 3/0291* (2013.01); *G09F 3/10* (2013.01); *C09J 2203/334* (2013.01); *C09J 2301/41* (2020.08); *C09J 2467/006* (2013.01); *G09F 2003/0257* (2013.01); *G09F 2003/0276* (2013.01); *Y10T 428/14* (2015.01)

(58) Field of Classification Search
  CPC ........... C09J 2467/006; B23K 26/0006; B23K 26/36; B23K 26/364; Y10T 428/14; C08K 3/04; C08K 2003/2237; G09F 3/0291; G09F 3/10; G09F 2003/0257; G09F 2003/0276; G09F 2003/021
  See application file for complete search history.

(56) References Cited

U.S. PATENT DOCUMENTS

| | | | |
|---|---|---|---|
| 6,066,437 A | 5/2000 | Kosslinger | |
| 6,165,594 A | 12/2000 | Moh | |
| 6,169,266 B1 | 1/2001 | Hughes | |
| 6,218,071 B1 | 4/2001 | Tutt | |
| 6,815,147 B2 * | 11/2004 | Fischer | B41M 5/24 283/101 |
| 2002/0051930 A1 | 5/2002 | Ozawa | |
| 2002/0191234 A1 | 12/2002 | Ishimoto | |
| 2005/0140768 A1 | 6/2005 | Aspenns | |
| 2007/0121506 A1 | 5/2007 | Wydrowski | |
| 2007/0281177 A1 | 12/2007 | Haubrich | |
| 2008/0014370 A1 | 1/2008 | Karapatis | |
| 2010/0181284 A1 | 7/2010 | Lee et al. | |
| 2010/0189979 A1 | 7/2010 | Takeda | |
| 2012/0013699 A1 * | 1/2012 | Ueta | B41M 5/382 347/225 |
| 2012/0318860 A1 | 12/2012 | Anderson | |
| 2013/0003206 A1 | 1/2013 | Kabagambe et al. | |
| 2013/0256418 A1 | 10/2013 | Havens | |
| 2014/0023838 A1 | 1/2014 | Egli et al. | |
| 2016/0018748 A1 | 1/2016 | Koger et al. | |
| 2017/0240459 A1 | 8/2017 | Gioffreda | |
| 2018/0350271 A1 * | 12/2018 | Schmitt | G09F 3/00 |

FOREIGN PATENT DOCUMENTS

| | | |
|---|---|---|
| JP | H08179475 A | 7/1996 |
| JP | H09297812 A | 11/1997 |
| JP | 2004058585 A | 2/2004 |
| WO | 2018185686 A1 | 10/2018 |

OTHER PUBLICATIONS

China National Intellectual Property Administration, First Office Action and Search Report, Application No. 201980001848 7, dated Oct. 7, 2021, 12 pages.

\* cited by examiner

LABEL CONSTRUCTION FOR ABLATIVE LASER MARKING

CROSS-REFERENCES TO RELATED APPLICATIONS

This application claims the benefit of U.S. Provisional Application No. 62/644,304 filed Mar. 16, 2018. The contents of that application are hereby incorporated by reference for all purposes as if set forth in their entirety herein.

TECHNICAL FIELD

This disclosure relates to labels including label constructions for ablative laser marking including for the marking of small areas and/or applications that require low debris production.

BACKGROUND

In many industries, thermal heat transfer printed labels fall short of achieving the level of barcode decodability with small font printing. Laser markable labels generally have greater readability/decodability at smaller print or font sizes. As product size gets smaller, the area available for product labels decreases and the value of being able to print at small sizes increases.

Initially, label manufacturers turned to laser markable black labels that exhibited white indicia to provide smaller, readable labels. Because black layers have more hide, black layers were configured over white or less dark layers to decrease cost and label thickness. However, laser ablated labels with such a configuration have poor contrast.

Unlike black colored labels (with light indicia), white colored labels (with dark indicia) are naturally reflective and limit a laser's effectiveness in transferring energy. Doping the topcoat of such labels by incorporating various near IR absorbing materials can result in an unacceptable level of color for what is supposed to be a white label. In addition, white pigments and/or fillers are typically required to achieve an appropriate amount of hide, or masking, for the darker layer underneath. In many instances, these pigments and fillers are composed of either mineral or metal compounds that are thermally stable at temperatures that far exceed what the laser output can achieve, providing a source of debris generation as the polymeric binder burns off upon exposure to the laser energy. For many industries, debris generation at any point in a process can pose a significant risk to the performance or quality of a final product, with potentially even higher defect levels downstream in the products' intended applications. Generation of debris also reduces the readability of the ablated labels.

SUMMARY

Considering the above, laser markable labels, and particularly laser markable white-on-black labels could generate problems for many industries. These problems range from being quite minimal (for example, the need to reprint labels) to being very significant (for example, defects from debris). Thus, a laser markable white-on-black label with improved readability at small font sizes and decreased debris generated during ablation would have great technical value.

Disclosed herein is an improved label structures for a white-on-black label. A sacrificial layer beneath the topcoat layer includes an infrared (IR) absorbing material and the topcoat includes a reflective pigment, such that the un-ablated regions of the label can remain a vibrant white. Still further, the sacrificial layer is engineered to be partially ablated, but in such a manner (i.e., with the constituents of the sacrificial layer being volatile under exposure from the laser) that the ablation produces less or no debris during the ablation process. During ablation, some portion of the laser can transmit through the topcoat layer and into the sacrificial layer to cause the sacrificial layer to volatilize, which in turn, results in the topcoat layer above the ablated portion being blown off of the label structure by ablation of the sacrificial layer. To this end and to obtain crisp and defined printing by laser ablation, the topcoat layer can be engineered such that it is relatively easy to be removed locally during the ablation process (i.e., be locally removed by the volatilizing of the sacrificial layer and not imprecisely peeled back or in such a manner that sizeable debris is created). These various structures are described herein and below.

According to one aspect, a label is provided that includes a topcoat layer and a sacrificial layer. The topcoat layer has a first color having a first L-value and includes at least one reflective pigment and a first polymeric binder. The sacrificial layer has a second color having a second L-value and includes at least one infrared (IR) absorbing material and a second polymeric binder. The first L-value is greater than the second L-value and the total amount of the reflective pigment(s) is from 40 wt % to 80 wt %, based on the weight of the topcoat layer.

In some forms, the topcoat layer may have a first facial surface and a second facial surface, the sacrificial layer may have a first facial surface and a second facial surface, and the second facial surface of the topcoat layer may be at least partially coupled to the first facial surface of the sacrificial layer. Accordingly, in some instances, the second facial surface may be in direct contact with the first facial surface of the sacrificial layer.

In some forms, the reflective pigment(s) may include titanium dioxide.

In some forms, the reflective pigment(s) may have a particle size of greater than or equal to 4 Hegman units, as measured in accordance with ASTM D1210-05.

In some forms, the topcoat layer may be substantially free from organic fillers.

In some forms, the first color may have an L-value from 80 to 100 and the second color may have an L-value from less than or equal to 30, as measured in accordance with ASTM E1347-06 (2015).

In some forms, the IR absorbing material(s) may include or be carbon black.

In some forms, the sacrificial layer may be substantially free from inorganic fillers and organic fillers.

In some forms, the sacrificial layer may be substantially free from mineral filler and metal oxide fillers.

In some forms, the IR absorbing material(s) and the second polymeric binder of the sacrificial layer may be mixed In some forms, the first polymeric binder and the second polymer binder may be composed of the same material.

In some forms, the difference between the first L-value and the second L-value may be greater than 50.

In some forms, wherein the total residual content after subjecting the topcoat layer and sacrificial layer to thermogravimetric analysis (from room temperature to 850° C. at a rate of 20° C./minute) may be from 10 wt % to 32 wt %.

In some forms, the topcoat layer may have a first thickness, the sacrificial layer may have a second thickness, and the second thickness may be greater than the first thickness.

In some forms, the topcoat layer may comprise at least one inorganic filler and the total residual content after subjecting the topcoat layer and sacrificial layer to thermogravimetric analysis (from room temperature to 850° C. at a rate of 20° C./minute) may be from 10 wt % to 32 wt %.

In some forms, the label may further include at least one of a film layer, an adhesive layer, and a liner.

According to another aspect, a liner is provided in the form of a roll carrying a plurality of the labels as described herein.

According to still another aspect, a substrate is provided bearing at least one of the labels described herein.

According to yet another aspect, a label is provided that comprises a topcoat layer, a sacrificial layer, a film layer, an adhesive layer, and an optional liner. The topcoat layer has (1) a first color having a first L-value and (2) a first facial surface and a second facial surface, the topcoat layer comprising at least one reflective pigment and a first polymeric binder. The sacrificial layer has (1) a second color having a second L-value and (2) a first facial surface and a second facial surface in which the first facial surface is in contact with the second facial surface of the topcoat layer. This sacrificial layer comprises at least one infrared (IR) absorbing material and a second polymeric binder. The film layer has a first facial surface and a second facial surface in which the first facial surface is in contact with the second facial surface of the sacrificial layer. The adhesive layer has a first facial surface and a second facial surface in which the first facial surface is in contact with the second facial surface of the film layer. The optional liner has a first facial surface and a second facial surface in which the first facial surface is in contact with the second facial surface of the adhesive layer. In this label, the first L-value is greater than the second L-value and the total amount of the at least one reflective pigment is from 40 wt % to 80 wt %, based on the weight of the topcoat layer.

According to another aspect, a method is provided for ablating a label having a topcoat layer and a sacrificial layer. At least one target region on the topcoat layer is irradiated with a laser beam and the topcoat layer and at least a portion of the sacrificial layer is removed in the at least one target region.

In some forms, the topcoat layer may have a first facial surface and a second facial surface, the sacrificial layer may have a first facial surface and a second facial surface, and the second facial surface of the topcoat layer may be coupled to the first facial surface of the sacrificial layer. The topcoat layer may be in direct contact with the first facial surface of the sacrificial layer.

In some forms, the step of irradiating may include irradiating the target region(s) on the topcoat layer and allowing at least a portion of the energy from the laser beam to irradiate the sacrificial layer at a region corresponding to the target region.

In some forms, the step of removing the topcoat layer and at least a portion of the sacrificial layer may include allowing the sacrificial layer to expand and blow out the topcoat layer.

These and still other advantages of the present disclosure will be apparent from the detailed description and drawings. What follows is merely a description of some preferred embodiments of the present disclosure. To assess the full scope of the disclosure the claims should be looked to as these preferred embodiments are not intended to be the only embodiments within the scope of the claims.

BRIEF DESCRIPTION OF THE DRAWINGS

The present disclosure is described generally with reference to the drawings for the purpose of illustrating certain embodiments only, and not for the purpose of limiting the scope of the present disclosure. In the drawings like numerals are used to designate like parts throughout the same.

DETAILED DESCRIPTION

Definitions

Figure 1:
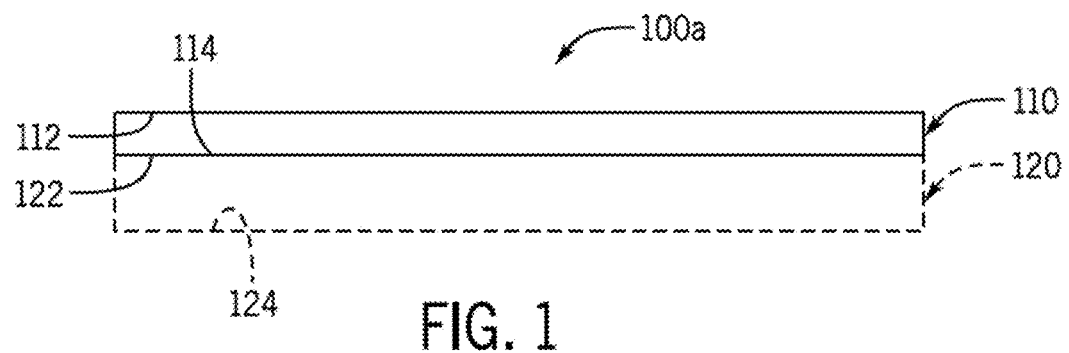
FIG. 1 is a schematic side view cross-section of a label in accordance with embodiments of the present disclosure.

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the present disclosure. Various modifications to the illustrated embodiments will be readily apparent to those skilled in the art, and the generic principles herein can be applied to other embodiments and applications without departing from embodiments of the present disclosure. Thus, embodiments of the present disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the present disclosure. Skilled artisans will recognize the examples provided herein have many useful alternatives and fall within the scope of embodiments of the present disclosure.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer thickness, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the label and layer thicknesses.

As used herein, "facial surface," and like terms, may be used in distinction to "edge surface." For example, if rectangular in shape or configuration, a layer, e.g., film, will comprise two opposing facial surfaces joined by four edge surfaces (two opposing pairs of edge surfaces, each pair intersecting the other pair at right angles). If circular in configuration, then the layer will comprise two opposing facial surfaces joined by one continuous edge surface.

As used herein, "pigment," and like terms, may refer to a visible light reflecting or absorbing material or compound that is present in a non-molecularly dispersed (particulate) form.

As used herein, "in direct contact," in the context of adjacent layers of a multilayer part, may refer to opposing facial surfaces of adjacent layers that are directly touching one another, e.g., such as a coating on a substrate. In other words, adjacent layers "in direct contact" with one another are in touching one another with no intervening layers.

Label Components

In some embodiments, the present disclosure provides a label 100. The label 100 is a multi-layer structure comprising two or more layers which can includes a topcoat layer 110 and a sacrificial layer 120. Other optional layers include, but are not limited to, a film layer 130, an adhesive layer 140, and/or a liner 150.

FIG. 1 shows a schematic side view cross-section a label 100a in accordance with some embodiments of the present disclosure. The label 100a includes a topcoat layer 110 and a sacrificial layer 120. The topcoat layer 110 includes a first facial surface 112 which may be exposed (for example, to the surrounding environment, such as air) and a second facial surface 114. The sacrificial layer 120 includes a first facial surface 122, which is coupled to the second facial surface 114 of the topcoat layer 110, and a second facial surface 124. The composition of the topcoat layer 110 and sacrificial layer 120 can be as described herein.

The sacrificial layer 120 can be applied to the second facial surface 114 of the topcoat layer 110 using methods known to the skilled artisan, such as deposition techniques (for example, chemical vapor deposition, physical vapor deposition, and so forth), spraying techniques (for example, thermal spraying), chemical and electrochemical techniques, roll-to-roll coating processes (for example, extrusion coating), physical coating processes, or combinations thereof.

Figure 2:
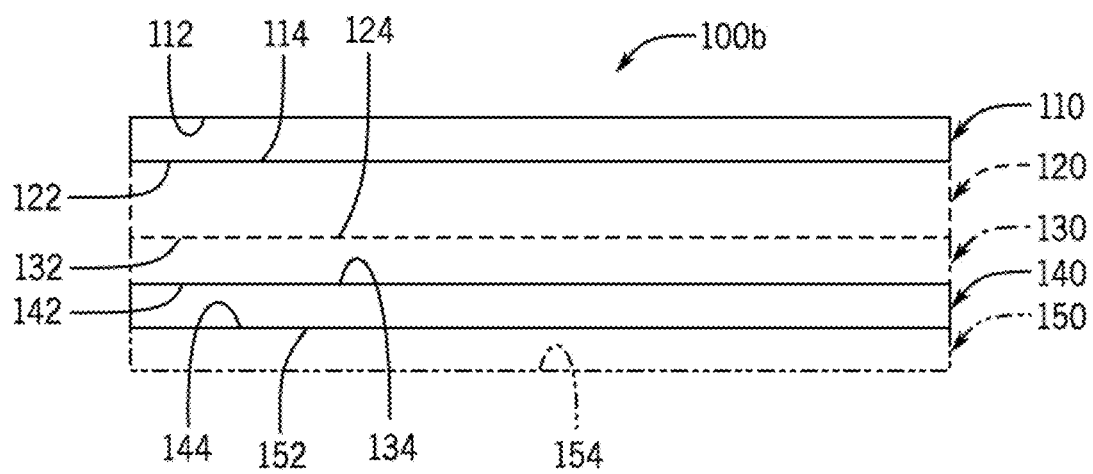
FIG. 2 is a schematic side view cross-section of another embodiment of a label in accordance with embodiments of the present disclosure.

FIG. 2 shows a schematic side view cross-section of a label 100b according to additional embodiments of the present disclosure. Particularly, FIG. 2 shows a label 100b comprising a plurality of optional layers, including a film layer 130, an adhesive layer 140 and a liner 150.

As illustrated, the label 100b includes a topcoat layer 110 having a first facial surface 112 and a second facial surface 114, a sacrificial layer 120 having a first facial surface 122 and a second facial surface 124, a film layer 130 having a first facial surface 132 and a second facial surface 134, an adhesive layer 140 having a first facial surface 142 and a second facial surface 144, and a liner layer 150 having a first facial surface 152 and second facial surface 154.

As shown in FIG. 2, the second facial surface 114 of the topcoat layer 110 is in at least partial contact with the first facial surface 122 of the sacrificial layer 120, the second facial surface 124 of the sacrificial layer 120 is in at least partial contact with the first facial surface 132 of the film layer 130, the second facial surface 134 of the film layer 130 is in at least partial contact with the first facial surface 142 of the adhesive layer 140, and the second facial surface 144 of the adhesive layer 140 is in at least partial contact with the first facial surface 152 of the liner 150. The first facial surface 112 of the topcoat layer 110 and the second facial surface 154 of the liner 150 are exposed.

The individual layers 110, 120, 130, 140 and 150 can be applied to one another in such a manner and by any convenient means.

It will be appreciated that additional layers may be present in the label construction which do not materially alter the essential properties of the label. Similarly, not all layers described with reference to FIG. 2 are necessary in the label construction and any combination of layers may be provided in a label according to the present disclosure, provided the label includes the topcoat layer 110 and the sacrificial layer 120.

In the embodiments shown in FIG. 2, the label 100b is shown having its own discrete liner 150; however, it is contemplated that a plurality of labels may be provided on a given liner. Still further, the labels can be according to any one or combination of two or more embodiments described herein. The labels can be any shape or size and disposed on the liner in any orientation or configuration. For example, in some embodiments, the liner takes the form a sheet with multiple labels positioned on the liner in an orientation and arrangement varied by convenience or design. In another embodiment, the liner takes the form of a roll, tape or strip of indefinite length having labels positioned on the liner in a linear fashion.

The various layers of a label as provided herein are now described in greater detail with respect to their compositions and attributes.

Topcoat Layer

The topcoat layer 110 provides the background color for the label 100, while accommodating for at least partial transmission of the laser therethrough during ablation such that the laser can interact with the sacrificial layer 120 during laser ablation, even if the topcoat layer 110 itself is not directly ablated by the laser. In some embodiments, the topcoat layer 110 is composed primarily a reflective pigment and a polymer binder. The reflective pigment provides, at least in part, the color of the topcoat layer 110. In some embodiments, the reflective pigment is a light pigment, while in other embodiments, the reflective pigment is a substantially white pigment.

In some embodiments, the reflective pigment is inorganic. Nonlimiting examples of reflective inorganic pigments include metal oxides, such as titanium dioxide; mixed metal oxides (MMOs), such as MMOs comprising chrome oxide green, chromium iron oxide, sodium aluminum sulphur silicate, manganese antimony oxide, chrome antimony tin oxide, cobalt aluminate, cobalt chromite, iron ammonium ferrocyanide, cobalt titanate, chrome iron nickel oxide, nickel antimony titanate, zinc iron chromite, iron oxide, zinc iron chromite, bismuth vanadate, iron manganese oxide, and mixtures thereof. For purposes of this application, carbon black is considered an organic material and therefore not included in the definition of an inorganic reflective pigment.

In some embodiments, the reflective pigment is titanium dioxide. The titanium dioxide may be present in one or more phase selected from rutile, anatase, brookite, akaogiite, hollandite-like form, ramsdellite-like form, α-PbO2-like form, cotunnite($PbCl_2$)-like, and combinations thereof. In some embodiments, the titanium dioxide may be present in a crystal structure selected from a tetragonal, orthorhombic, monoclinic, cubic, and combinations thereof.

The reflective pigment can have a particle size of greater than or equal to 4 Hegman units, as measured according to ASTM D1210-05. In some embodiments, the reflective pigment as a particle size from greater than or equal to 4 Hegman units, or 5 Hegman units, or 6 Hegman units to 7 Hegman units, or less than 8 Hegman units, as measured according to ASTM D1210-05. This particle size can help permit passage of the laser through the topcoat layer 110 during the exposure to the laser as well as permit the topcoat layer 110 to be cleanly and crisply removed upon the volatizing of the sacrificial layer 120 as opposed to larger particle sizes.

In some embodiments, the topcoat layer 110 includes a mixture of two or more reflective pigments as described herein.

The polymeric binder may be formed from a polymeric matrix having one or more reflective pigment dispersed therein. Nonlimiting examples of suitable materials for the polymeric binder include aliphatic polyurethanes, aromatic polyurethanes, polyesters, polyacrylates, crosslinked phenoxy resins, and mixtures thereof. In some embodiments, the polymeric binder is a polyester.

In some embodiments, the reflective pigment and polymeric binder are provided at a ratio from 3:1, or 2.5:1, or 2:1, or 1.5:1, or 1:1 to 1:1.5, or 1:2, or 1:2.5, or 1:3. A reflective pigment to polymeric binder ratio from 3:1 to 1:3 is generally visually reflective while still permitting a portion of a laser's energy through. However, it will be appreciated that a change in the particle size of the reflective pigment at a given reflective pigment to polymeric binder ratio will change the reflectiveness of the topcoat layer 110. For example, a larger particle size at a given reflective pigment to polymeric binder ratio will result in a more reflective topcoat layer 110, while a decrease in the particle size at the same ratio will result in a less reflective topcoat layer 110.

In some embodiments, the ratio of reflective pigment to polymeric binder is approximately 1:1, which results in an approximately even distribution of the reflective pigment throughout the topcoat layer 110, particularly when the particle size of the reflective pigment is small (e.g., greater than or equal to 4 Hegman units, as measured according to ASTM D1210-05).

In some embodiments, the reflective pigment includes particles having at least one dimension (for example, length, height, average diameter) that is on the nanometer scale or micrometer scale. In some embodiments, the particles have a dimension that ranges between 20 nm to 5 µm. In some embodiments, the particles have a dimension that is about 0.05 µm, or 0.1 µm, or 0.15 µm, or 0.20 µm, or 0.30 µm, or 0.4 µm, or 0.5 µm, or 0.6 µm, or 0.7 µm, or 0.8 µm, or 0.9 µm, or 1 µm, and mixtures thereof. In some embodiments, a majority of the reflective pigment particles in the polymeric binder have a dimension that ranges between 0.1 and 0.5 µm, or ranges between 0.1 and 0.3 µm. In some embodiments, at least 50%, or at least 60%, or at least 70%, or at least 80%, or at least 90% of the reflective particles in the polymeric binder have a dimension that ranges between 0.1 and 0.5 µm, or ranges between 0.1 and 0.3 µm.

In some embodiments in which the reflective pigment is titanium dioxide, the reflective pigment and polymeric binder are provided at a ratio from 2:1, or 1.5:1, or 1.25:1, or 1.2:1, or 1.1:1 to 1:1, or 1:1.1, or 1:1.2, or 1:1.25, or 1:1.5, or 1:2. In some embodiments, the reflective pigment is titanium dioxide and the ratio of reflective pigment to polymeric binder is approximately 1:1.

In some embodiments, the topcoat layer 110 may additional include one or more fillers, IR absorbing materials or other additives. In some embodiments, the one or more fillers, IR absorbing materials or other additives are included to change the physical and/or optical properties of the topcoat layer 110. For example, in some embodiments the topcoat layer 110 may include silica or another matting agent to give the topcoat layer 110 a matte rather than glossy appearance. The topcoat layer 110 may also optionally include inorganic fillers, such as mineral-based compounds like calcium carbonate.

In further embodiments, the topcoat layer 110 may include one or more infrared (IR) absorbing materials. Non-limiting examples of suitable IR absorbing materials include carbon black or any common grade of standard dark pigments. In some embodiments, the topcoat layer 110 is free from any IR absorbing materials.

Small amounts of other additives, such as optical brighteners, dopants, etc. may also be present provided that such amounts do not affect the material and necessary properties of the topcoat layer 110 and resulting label.

In some embodiments, any fillers, IR absorbing materials or other additives included in the topcoat layer 110 volatize when subjected to a laser beam, such as, for example, when any such secondary pigments, additives, or IR absorbing materials are organic. In other embodiments, any fillers, IR absorbing materials or other additives included in the topcoat layer 110 do not volatize when subjected to a laser beam, such as, for example, when any such secondary pigments, additives or IR absorbing materials are inorganic.

In some embodiments, the topcoat layer 110 is substantially free, or free, from inorganic fillers. As used in reference to the topcoat layer 110, "inorganic fillers" means inorganic materials other than the reflective pigment(s). Inorganic fillers, such as calcium carbonate, do not volatize upon laser ablation and therefore tend to contribute to debris formation during laser writing. In some embodiments, "substantially free from inorganic fillers" means that the topcoat layer 110 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or 0 wt % of inorganic fillers, based on the total weight of the topcoat layer 110. Inorganic fillers include, but are not limited to, carbonates, silicates, borates and combinations thereof.

In some embodiments, the topcoat layer 110 is substantially free, or free, from organic pigments and fillers. For purposes of this application, carbon black is considered an organic material. When referenced in conjunction with the topcoat layer 110, carbon black is therefore considered an organic pigment or organic filler. Organic pigments and fillers volatize when impacted or contacted with a laser beam, therefore contributing to debris formation during laser writing. In some embodiments, "substantially free from organic pigments and fillers" means that the topcoat layer 110 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or less than 0.03 wt %, or less than 0.02 wt %, or less than 0.01 wt %, or less than 0.005 wt %, or less than 0.001 wt %, or 0 wt % of such fillers, based on the total weight of the topcoat layer 110. Non-limiting examples of organic pigments and fillers include, but are not limited to, carbon black.

In some embodiments, the topcoat layer 110 is substantially free, or free, from inorganic fillers and organic pigments and fillers. That is, in some embodiments, the topcoat layer 110 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or 0 wt % of inorganic fillers and less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or less than 0.03 wt %, or less than 0.02 wt %, or less than 0.01 wt %, or less than 0.005 wt %, or less than 0.001 wt %, or 0 wt % organic pigments and fillers, based on the total weight of the topcoat layer 110. In other words, in some embodiments, the topcoat layer 110 consists essentially of, or consists of, the reflective pigment(s) and polymeric binder.

The L-value of the topcoat layer 110 is from 80, or 85, or 87, or 90 to 92, or 95, or 97, or 100, as determined by ASTM E1347-06 (2015). In a particular embodiment, the L-value of the topcoat layer 110 is from 80, or 85, or 87 to 90, or 92, or 95, as determined by ASTM E1347-06 (2015).

In some embodiments, the topcoat layer 110 is light in color. Exemplary light colors include, and are not limited to, whites, off-whites, creams, tans, grays, pastels, yellows, organs, reds, greens, blues and purples. In some embodiments, the topcoat layer 110 is generally white.

In some embodiments, the total amount of reflective pigment and filler, if any, present in the topcoat layer 110 is from 40 weight percent (wt %), or 45 wt %, or 50 wt %, or 55 wt % to 60 wt %, or 65 wt %, or 70 wt %, or 75 wt %, or 80 wt %, based on the total weight of the topcoat layer 110.

The weight of the topcoat layer 110 is from 12 pounds per ream (lb/ream), or 13 lb/ream, or 14 lb/ream, or 15 lb/ream, or 16 lb/ream, or 17 lb/ream, or 18 lb/ream, or 19 lb/ream to 20 lb/ream, or 21 lb/ream, or 22 lb/ream, or 23 lb/ream, or 24 lb/ream, or 25 lb/ream, or 26 lb/ream.

The thickness of the topcoat layer 110 may vary by convenience and in consideration of the specific formulations, and particularly coloring, of the topcoat layer 110 and sacrificial layer 120. In some embodiments, the thickness of the topcoat layer 110 is from 0.25 mil, or 0.30 mil, or 0.35 mil, or 0.40 mil, or 0.45 mil, or 0.50 mil, or 0.55 mil, or 0.60 mil, or 0.65 mil, or 0.70 mil, or 0.75 mil to 0.80 mil, or 0.85 mil, or 0.90 mil, or 0.95 mil, or 1.00 mil, or 1.05 mil, or 1.10 mil, or 1.15 mil, or 1.20 mil, or 1.25 mil, or 1.30 mil, or 1.35 mil, or 1.40 mil, or 1.45 mil, or 1.50 mil.

Sacrificial Layer

The sacrificial layer 120 provides the color of the markings for the label 100. The sacrificial layer 120 is composed of an IR absorbing material and a polymeric binder. The IR absorbing material provides, at least in part, the print color of the label 100. In some embodiments, the IR absorbing material is a dark pigment, while in other embodiments, the IR absorbing material is a substantially black pigment. Non-limiting examples of suitable IR absorbing materials include carbon black. In some embodiments, the IR absorbing material is carbon black.

The IR absorbing pigment has a particle size of greater than or equal to 4 Hegman units, as measured according to ASTM D1210-05. In some embodiments, the reflective pigment has a particle size from greater than or equal to 4 Hegman units, or 5 Hegman units, or 6 Hegman units to 7 Hegman units, or less than 8 Hegman units, as measured according to ASTM D1210-05.

In some embodiments, the sacrificial layer 120 includes a mixture of two or more IR absorbing materials as described herein.

The polymeric binder may be formed from a polymeric matrix having one or more IR absorbing material dispersed therein. Non-limiting examples of suitable materials for the polymeric binder include aliphatic polyurethanes, aromatic polyurethanes, polyesters, polyacrylates, crosslinked phenoxy resins, and mixtures thereof. In some embodiments, the polymeric binder of the sacrificial layer 120 is the same polymeric binder used in the topcoat layer 110 (although it could also be different in other embodiments). In some embodiments, the polymeric binder is a polyester resin.

In some embodiments, the sacrificial layer 120 may additional include one or more fillers or other additives. The amount of such fillers or additives is such that the one or more fillers or additives do not affect the material and necessary properties of the sacrificial layer 120 and resulting label.

In some embodiments, the sacrificial layer 120 is substantially free, or free, from inorganic fillers and organic fillers. As used in reference to the sacrificial layer 120, "inorganic fillers" means inorganic materials other than IR absorbing materials and "organic fillers" means organic materials other than IR absorbing materials. For purposes of this application, carbon black is considered an organic material, and, because carbon black is an IR absorbing material, carbon black is not an organic filler as the term is used with reference to the sacrificial layer 120. In some embodiments, "substantially free from inorganic fillers and organic fillers" means that the sacrificial layer 120 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or 0 wt % of inorganic fillers and organic fillers, based on the total weight of the topcoat layer 110. Inorganic fillers include, but are not limited to, carbonates such as calcium carbonate, metal oxides and mineral fillers. Organic fillers include, but are not limited to mineral fillers.

In some embodiments, the sacrificial layer 120 is substantially free, or free, from mineral fillers and metal oxide fillers. Mineral fillers and metal oxide fillers do not volatize upon laser ablation and therefore tend to contribute to debris formation during laser writing. In some embodiments, "substantially free from mineral fillers and metal oxide fillers" means that the sacrificial layer 120 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or 0 wt % of mineral fillers and metal oxide fillers, based on the total weight of the sacrificial layer 120. Mineral fillers and metal oxide fillers include, but are not limited to, titanium dioxide, chrome oxide green, chromium iron oxide, sodium aluminum Sulphur silicate, manganese antimony oxide, chrome antimony tin oxide, cobalt aluminate, cobalt chromite, iron ammonium ferrocyanide, cobalt titanate, chrome iron nickel oxide, nickel antimony titanate, zinc iron chromite, iron oxide, zinc iron chromite, bismuth vanadate, iron manganese oxide and combinations of these and other fillers.

In some embodiments, the sacrificial layer 120 is substantially free, or free, from both organic fillers and inorganic fillers, including mineral fillers and metal oxide fillers. In some embodiments, "substantially free from mineral fillers and metal oxide fillers" means that the sacrificial layer 120 contains less than 5 wt %, or less than 4 wt %, or less than 3 wt %, or less than 2 wt %, or less than 1 wt %, or less than 0.5 wt %, or less than 0.2 wt %, or less than 0.1 wt %, or less than 0.05 wt %, or 0 wt % of organic fillers and inorganic fillers, based on the total weight of the sacrificial layer 120.

The L-value of the sacrificial layer 120 is less than 35, or less than or equal to 30, or less than or equal to 25, or less than or equal to 20, or less than or equal to 15, or less than or equal to 10, or less than or equal to 5, as determined by ASTM E1347-06. In some embodiments, the L-value of the sacrificial layer is from greater than 0, or 5, or 10, or 15 to 20, or 25, or 30, as determined by ASTM E1347-06 (2015). In some embodiments, the L-value of the topcoat layer 110 is from 2, or 5, or 10 to 15, or 20, or 25, as determined by ASTM E1347-06 (2015).

In some embodiments, the sacrificial layer 120 is dark in color. Exemplary dark colors include blacks, grays, browns, purples, blues, greens, reds, oranges, and yellows. In some embodiments, the sacrificial layer 120 is generally black.

In some embodiments, difference between the L-value of the topcoat layer 110 and the L-value of the sacrificial layer 120 ($\Delta L$) is greater than or equal to 50. That is, the particular colors of the topcoat layer 110 and sacrificial layer 120 are chosen such that the contrast between the two is sufficient for readability. For example, the darker the sacrificial layer 120, the less white the topcoat layer 110 need to be for sufficient readability. Likewise, the lighter a sacrificial layer 120, the more white the topcoat layer 110 need be.

In some embodiments, the $\Delta L$ is from 50, or 55, or 60, or 65, or 70, or 75 to 80, or 85, or 90. For labels having black indicia on a white background, the minimum $\Delta L$ needed to ensure sufficient readability is at least approximately 50, while the minimum $\Delta L$ needed to ensure the readability of labels having white indicia on a black background is at least approximately 80. Using a topcoat layer 110 with an L-value from 80 to 100 and a sacrificial layer 120 with an L-value from greater than 0 to 30 means that $\Delta L$ values on the lower end (i.e., $\Delta L$ of at least 50) are acceptable, and $\Delta L$ values from 70, or 75 to 80, or 85, or 90 are readily attainable and show enhanced readability.

In some embodiments, the difference between the color of the topcoat layer 110 as defined by CIELAB and the color of the sacrificial layer 120 as defined by CIELAB ($\Delta E$) is greater than 50. In some embodiments, the $\Delta E$ is from 50, or 55, or 60, or 65, or 70, or 75 to 80, or 85, or 90. The $\Delta E$ is calculated using the following equation:

$$\sqrt{((L_1-L_2)^2+(a_1-a_2)^2+(b_1-b_2)^2)}$$

wherein $L_1$ is the L-value of the topcoat layer 110, $L_2$ is the L-value of the sacrificial layer 120, $a_1$ is the a-value (red/green) of the topcoat layer 110, $a_2$ is the a-value of the sacrificial layer 120, $b_1$ is the b-value (yellow/blue) of the topcoat layer 110, and $b_2$ is the b-value of the sacrificial layer 120, as the L-values, a-values and b-values are defined by International Commission on Illumination (CIE).

The weight of the sacrificial layer 120 is from 10 lb/ream, or 15 lb/ream, or 20 lb/ream, or 22 lb/ream, or 25 lb/ream, or 27 lb/ream, or 30 lb/ream to 35 lb/ream, or 38 lb/ream, or 40 lb/ream, or 45 lb/ream, or 46 lb/ream, or 50 lb/ream, or 52 lb/ream.

The sacrificial layer 120 can have a thickness greater than that of the topcoat layer 110. The specific thickness of the sacrificial layer 120 depends on the desired power setting for a laser used to write on the label. The greater the power setting, the more sacrificial layer 120 which will be consumed, and the thicker the sacrificial layer 120 should be. During this consumption of the sacrificial layer 120 during laser ablation, the sacrificial layer 120 can volatize resulting in the topcoat layer 110 being "blown off" from above the sacrificial layer 120.

In some embodiments, the sacrificial layer 120 has a thickness from 0.5 mil, or 0.65 mil, or 0.85 mil, or 1.0 mil, or 1.3 mil to 1.5 mil, or 1.75 mil, or 2.0 mil, or 2.2 mil, or 2.5 mil, or 2.8 mil.

In some embodiments, the total residual content after subjecting the topcoat layer 110 and sacrificial layer 120, and only the topcoat layer 110 and sacrificial layer 120, to thermogravimetric analysis (from room temperature to 850°

C. at a rate of 20° C./minute) is from 10 wt %, or 12 wt %, or 15 wt %, or 18 wt %, or 20 wt % to 22 wt %, or 25 wt %, or 27 wt % or 30 wt %, or 32 wt %.

In some embodiments, the total amount of reflective pigment and filler, if any, in the topcoat layer 110 is from 40 weight percent (wt %), or 45 wt %, or 50 wt % or 55 wt % to 60 wt %, or 65 wt %, or 70 wt %, or 75 wt %, or 80 wt %, based on the total weight of the topcoat layer 110, and the total residual content after subjecting the topcoat layer 110 and sacrificial layer 120 to thermogravimetric analysis (from room temperature to 850° C. at a rate of 20° C./minute) is from 10 wt %, or 12 wt %, or 15 wt %, or 18 wt %, or 20 wt % to 22 wt %, or 25 wt %, or 27 wt % or 30 wt %, or 32 wt %.

Film Layer

The film layer 130, when present, provides support and resistance against shrinking, stretching, bending and tearing. In some embodiments, the film layer 130 is composed of a polymeric resin. Non-limiting examples of suitable polymeric resins include polyesters, polyimides, polypropylene, polyether ether ketone, and combinations thereof.

Adhesive Layer

The adhesive layer 140, when present, allows the label to attach to a target, such as a product or packaging. The adhesive layer 140 can vary widely and can include, but is not limited to, pressure sensitive adhesives (PSAs). Suitable PSAs may include elastomers doped with a tackifier. In some aspects, the elastomer may include acrylics, butyl rubber, ethylene-vinyl acetate, natural rubber, nitriles, silicon rubbers, and mixtures thereof. In some aspects, the tackifier could include silicate resins comprising trimethyl silane and silicon tetrachloride.

Figure 5:
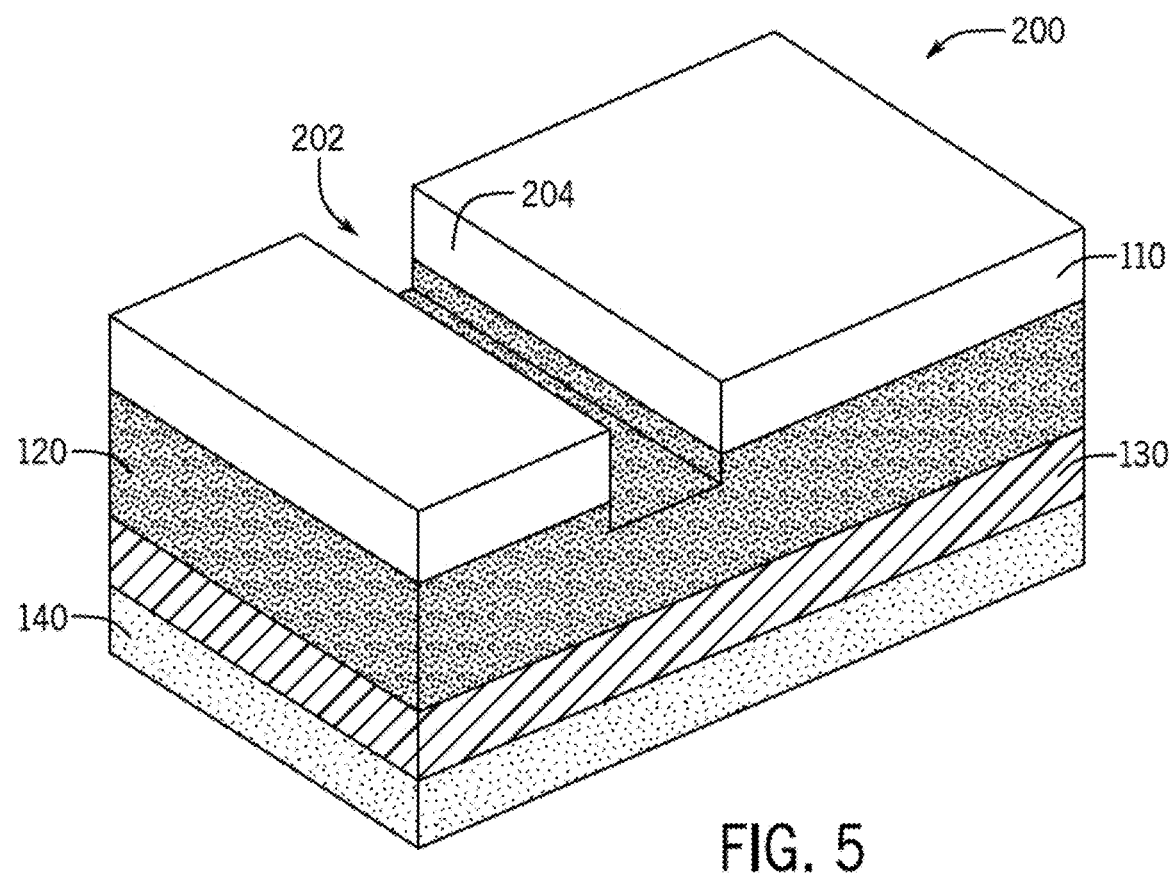
FIG. 5 is a schematic side view cross-section of an ablated label for affixation to a substrate in accordance with embodiments of the present disclosure.

FIG. 5 shows an exemplary application of a label 200, having its liner 150 removed and being adhesively for attachment to a surface of a substrate. The surface can be flat and smooth; however, the surface may be curved, irregularly textured, undulating, or may be other shapes. Nonlimiting examples of suitable substrate materials include plastic, metal, paper, polymeric materials, rubber, and glass.

Liner

The liner 150, when present, protects the adhesive layer 140 prior to application of the label 100. In some embodiments, the liner 150 comprises a silicone coated paper, a clay coated paper, polyesters, and mixtures thereof.

Direct Marking

Figure 6:
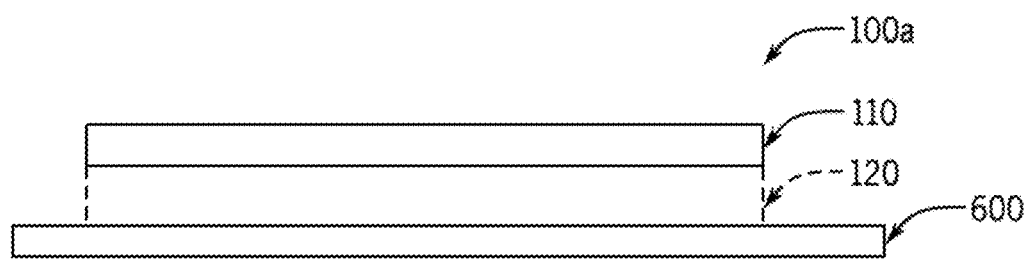
FIG. 6 is a schematic side view cross-section of a substrate containing a label for direct marking in accordance with embodiments of the present disclosure.
Figure 7:
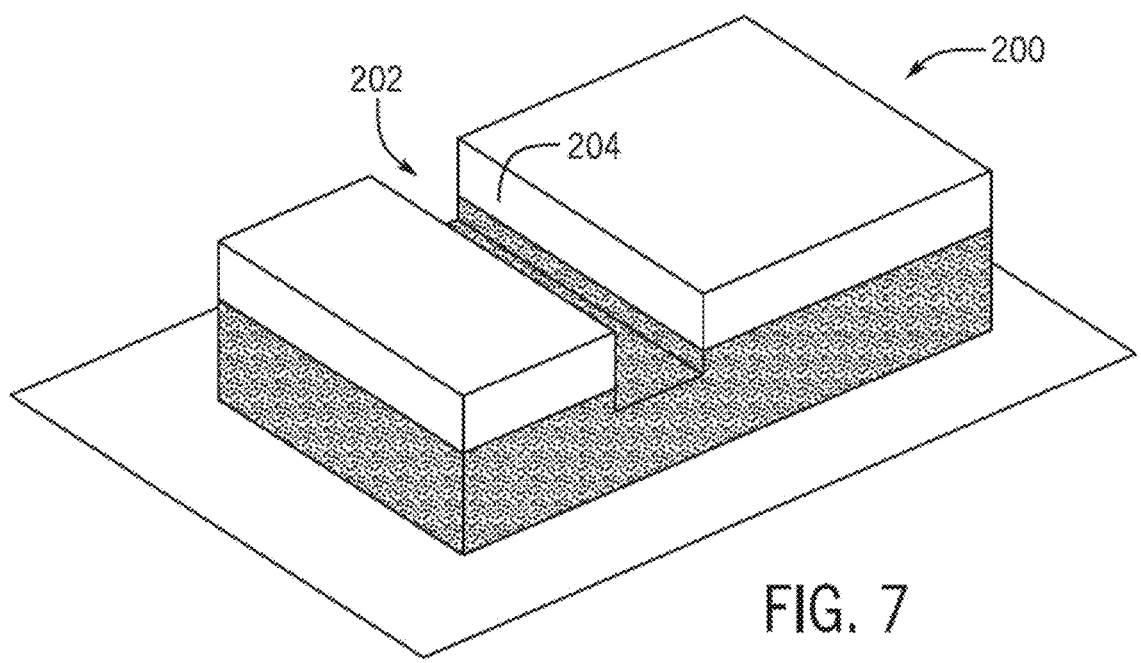
FIG. 7 is a schematic side view cross-section of the embodiment shown in FIG. 6 after ablation of the label.

FIG. 6 shows a label 100 used in direct marking of a surface of a substrate 600. In direct marking, certain layers of a label are provided directly on a surface of a substrate rather than on a removable liner. In the embodiment shown in FIG. 6, the topcoat layer 110 and sacrificial layer 120 are provided directly on the surface of the substrate 600 without an intermediate film layer 130, adhesive layer 140 or liner 150; however, one or more additional layers may be included, such as, for example, layers to strengthen the bond of the label 100 to the surface of the substrate. FIG. 7 shows an exemplary application of label 200—that is, label 100 after ablation—as provided in FIG. 6 in a direct marking context.

Method of Ablation

Figure 3:
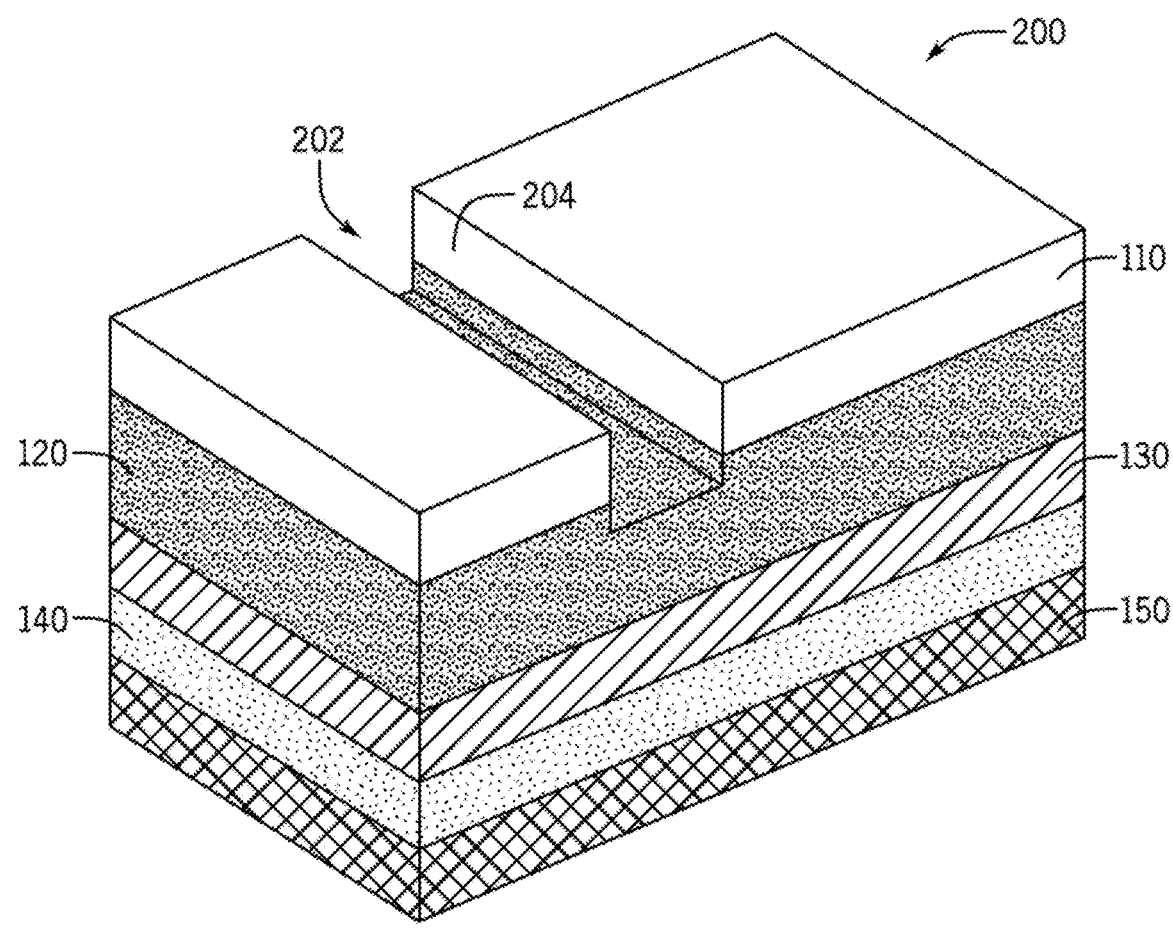
FIG. 3 is a schematic side view cross-section of an ablated label in accordance with embodiments of the present disclosure.
Figure 4:
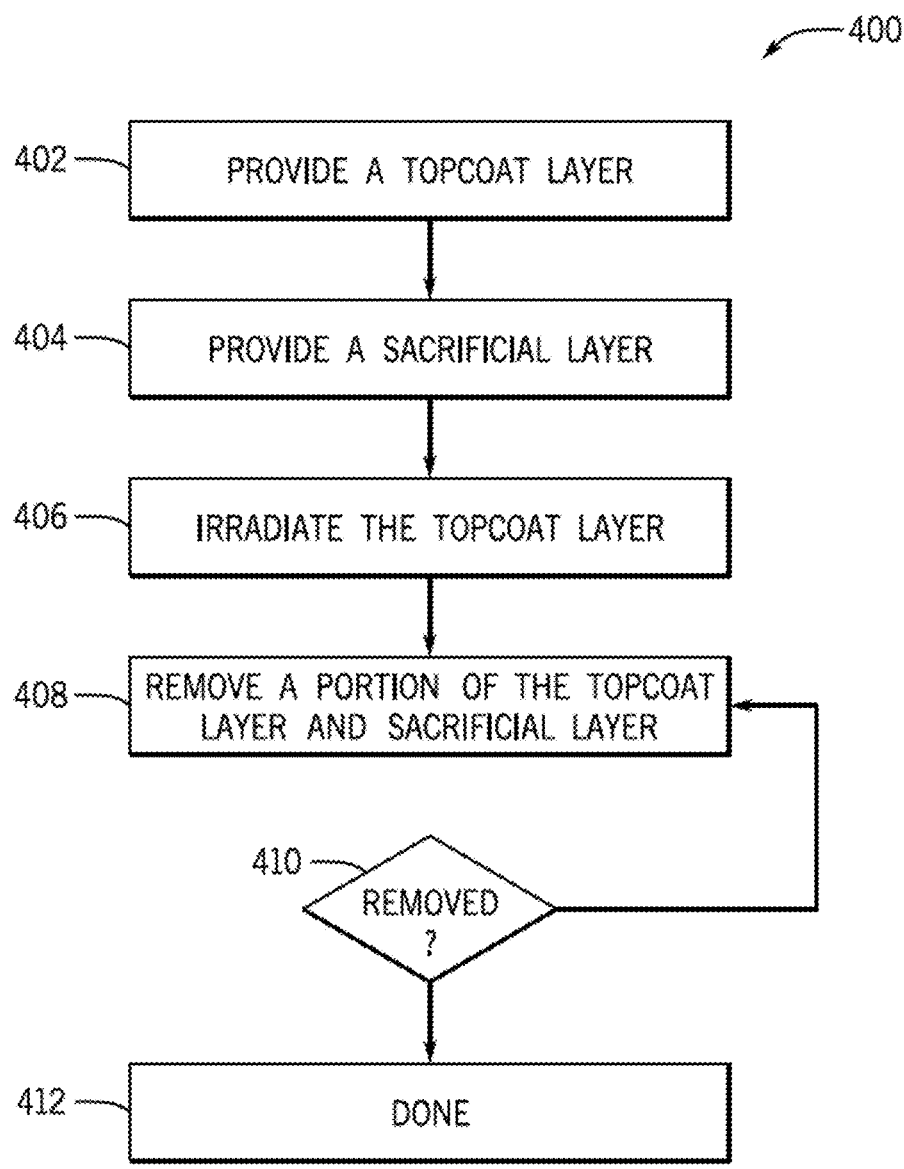
FIG. 4 illustrates a method of ablating a label in accordance with embodiments of the present disclosure.

FIG. 3 generally illustrates an exemplary ablated label 200 (that is, label 100 after ablation) and FIG. 4 sets forth the steps for forming the ablated label 200 from label 100 (collectively, method 400). As indicated by steps 402 and 404, a topcoat layer 110 and a sacrificial layer 120 are provided, such as in the form of a label 100, for example, having the structure of label 100a or 100b as shown in FIGS. 1 and 2. The topcoat layer 110 and sacrificial layer 120 are in accordance with any embodiment or combination of embodiments provided herein. In some embodiments, the topcoat layer 110 may be marked so as to outline a target region, such as target region 202, for irradiation.

A laser beam is then directed to irradiate a portion of the label 100, such as target region 202, with the laser's energy passing through the topcoat layer 110 and being absorbed by the sacrificial layer 120 in order to remove a portion 204 of the sacrificial layer 120 and topcoat layer 110, as indicated by steps 406 and 408. The laser beam will continue to irradiate the label 100, and specifically the sacrificial layer 120, until sufficient topcoat layer 110 and sacrificial layer 120 is removed to form desired indicia, as indicated by decision block 410. Once the desired indicia are formed, the process completes 412 and an ablated label 200 is formed form the label 100.

In some embodiments, the laser beam is produced form a laser system. Suitable laser systems include, but are not limited to, near IR diode lasers, Nd-YAG lasers, or $CO_2$ lasers. In some embodiments, the laser beam may be pulsed to create a time-limited burst of energy to the label 100 (or more particularly, a target region 202). In some embodiments, the laser system works over a wide range of infrared (IR) frequencies.

In embodiments the laser system operates at a power level between 1 W and 60 W with the power employed being correlated to the desired amount of sacrificial layer to be removed.

It will be understood that the above parameters are provided as being exemplary, and other workable operation laser parameters may be used.

EXAMPLES

The following examples set forth, in detail, ways in which any of the labels as described herein may be used or implemented, and assist to enable one of skill in the art to more readily understand the principles thereof. The following examples are presented by way of illustration and are not meant to be limiting in any way.

The following example illustrates how the adjustments of layer thickness of the topcoat layer and the sacrificial layer can result in appreciable differences in debris production, even where the composition of the layers is otherwise similar. Among other things, assuming the topcoat layer has been engineered to sufficiently permit laser penetration therethrough to the sacrificial layer, by having a thicker sacrificial layer there is more material to volatize in the sacrificial layer which can thereby improve removal of the topcoat layer during ablation. Additionally, there may be benefits associated with having a thicker sacrificial layer— even in cases in which the topcoat layer thickness is also increased to some extent—in that there is a greater depth or thickness and target region during the application of the laser such, that there is a greater margin for error with respect to laser power configurations. Put differently, by increasing the depth of the sacrificial layer, there is a greater ablation window for laser power configuration and potentially greater room for error in the fabrication processes of the label structures themselves.

A structure for a first comparative label used in the following examples has a white topcoat (approximately 0.2 mils) containing polyester and titanium dioxide with a black underlayer (approximately 0.2 mils) comprising polyester and carbon black. The topcoat and underlayer are provided on a film layer (polyimide), adhesive layer (acrylic) and liner (paper).

A structure for a second comparative label has a topcoat layer (approximately 0.75 mils) with a polyester polymeric binder and including titanium dioxide as the reflective pigment and a sacrificial layer (approximately 1.8 mils) containing a polyester as the polymeric binder and carbon black as the IR absorbing material. The topcoat layer and sacrificial layer are provided on a film layer (polyimide), adhesive layer (acrylic), and liner (paper).

Example I

A first sample of the first comparative label and a first sample of the second comparative label are each ablated using 36% power from a 50 watt $CO_2$ laser. The ablated region of each label is generally square in shape. FIGS. 8A-8C and FIGS. 9A-9B show the laser ablated first comparative label and second comparative label, respectively.

Figure 8A:
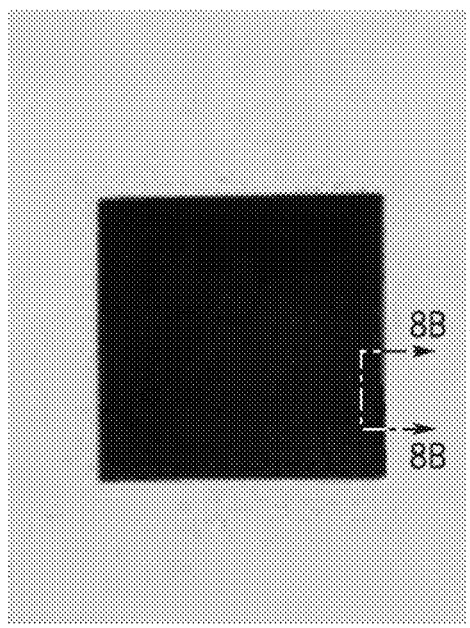
FIG. 8A is a nonlimiting example of an ablated first sample of a first comparative label structure.
Figure 8B:
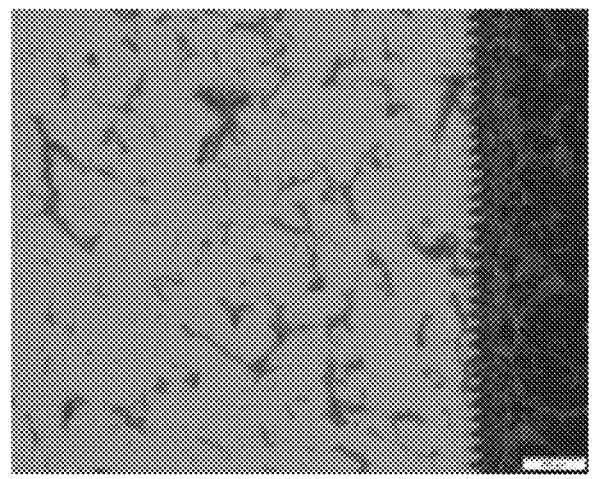
FIG. 8B shows a portion of the non-ablated region of the first sample of the first comparative label of FIG. 8A at 50× magnification.
Figure 8C:
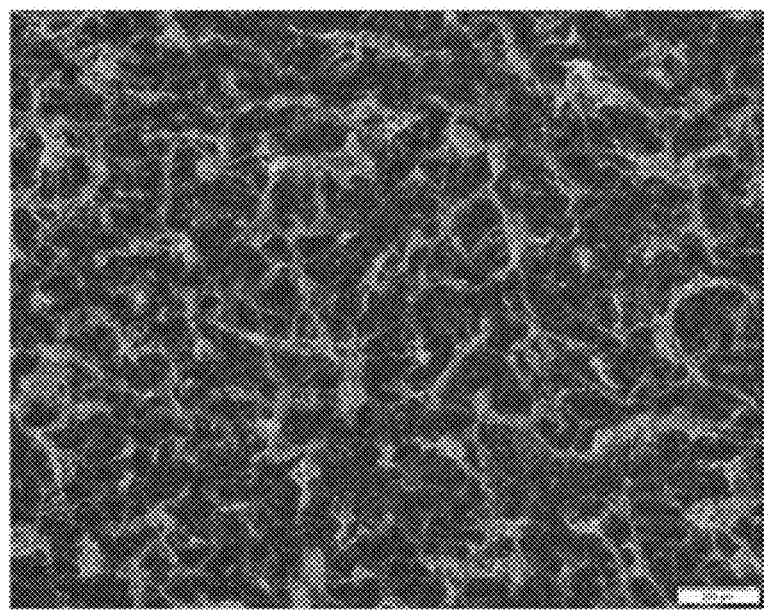
FIG. 8C shows a portion of the ablated region of the first sample of first comparative label of FIG. 8A at 50× magnification.

FIGS. 8A-8C show the ablated first comparative label, with FIGS. 8B and 8C showing a portion of the non-ablated area and the ablated area, respectively at 50× magnification. In FIG. 8B, the debris is visible as the darker regions on the lighter background, while in FIG. 8C, the debris is visible as the lighter regions on the darker background. The readability of the first comparative label, particularly at smaller font sizes, will be compromised due to the formation of debris.

Figure 9A:
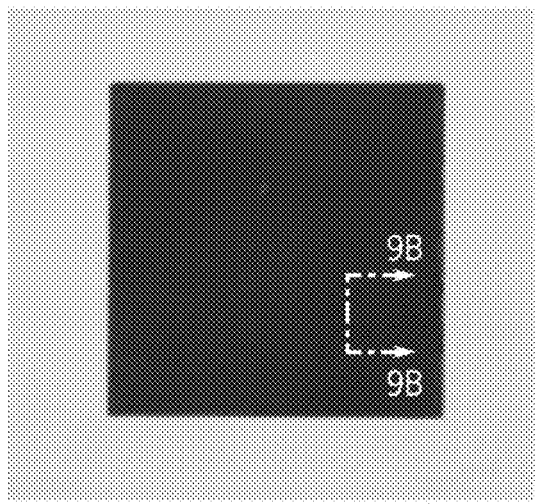
FIG. 9A is a nonlimiting example of an ablated first sample of a second comparative label structure.
Figure 9B:
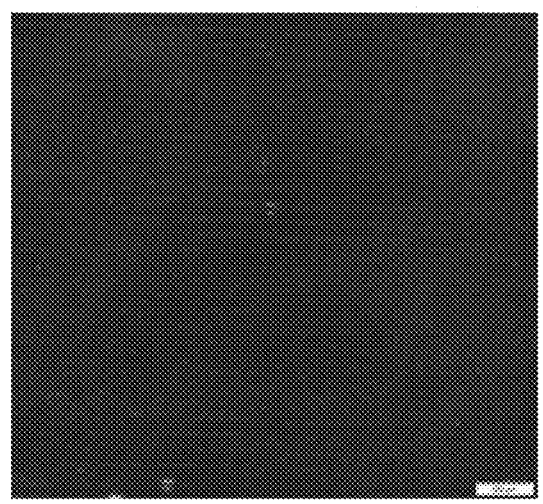
FIG. 9B shows a portion of the ablated region of the first sample of the second comparative label of FIG. 9A at 50× magnification.

FIGS. 9A-9B show the ablated second comparative label, with FIG. 9B showing the ablated area at 50× magnification. A comparison of FIG. 9B to FIG. 8C shows that the second comparative label results in a more complete ablation of the topcoat layer with significantly less debris formation than the first comparative label. Notably, this occurs even though the topcoat is thicker on the second comparative label than the first comparative label, and demonstrates how comparative thicknesses between the topcoat and the sacrificial layer may be used to improve ablative results.

Example II

Figure 10A:
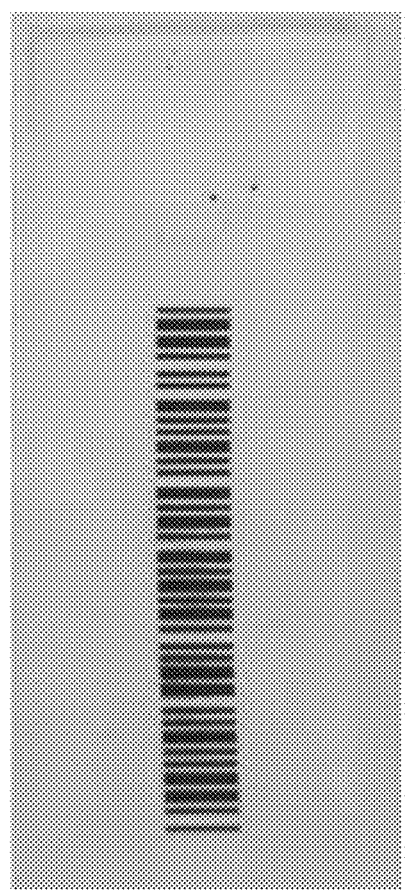
FIG. 10A is a nonlimiting example of a ablated second sample of the first comparative label.
Figure 11A:
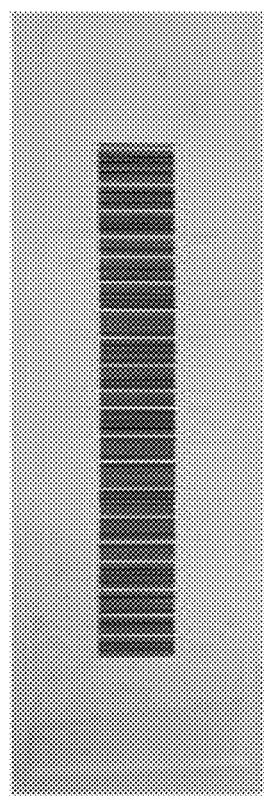
FIG. 11A is a nonlimiting example of an ablated second sample of the second comparative label in accordance with embodiments of the present disclosure.

To further illustrate the debris formed, a second sample of the first comparative label and a second sample of the second comparative label are ablated using 36% power from a 50 watt $CO_2$ laser as described above. The ablated region of each label is a pattern similar to a barcode. FIGS. 10A and 11A show the ablated region of the second sample of the first comparative label and the second sample of the second comparative label, respectively. After ablation, a piece of clear Scotch tape is placed over the ablated regions of the second sample of the first comparative label and the second sample of the second comparative label so that the adhesive side of the tape is in physical contact with the ablated regions of the respective labels. The tape is then removed and affixed to a white substrate to determine the magnitude of debris which affixes to the tape.

Figure 10B:
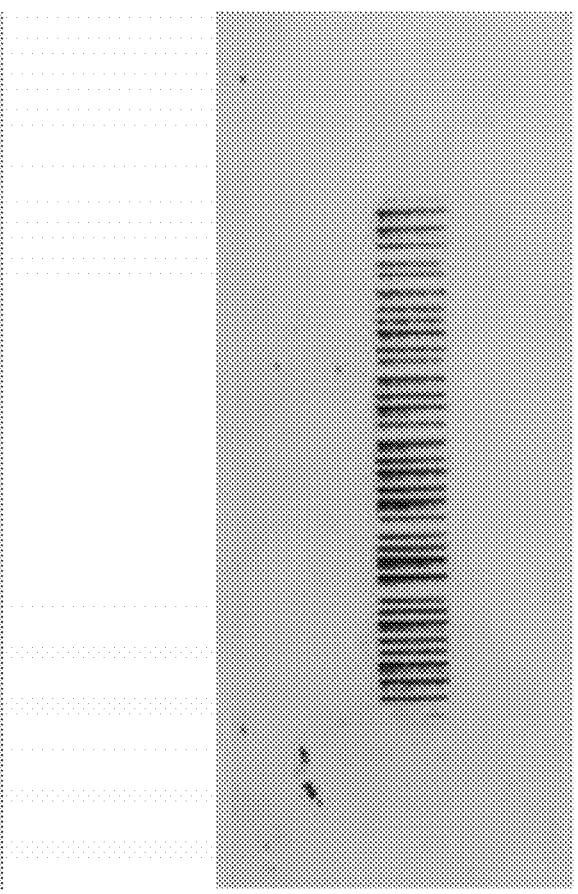
FIG. 10B shows the results of the tape test completed on the ablated second sample of the first comparative label of FIG. 10A.
Figure 11B:
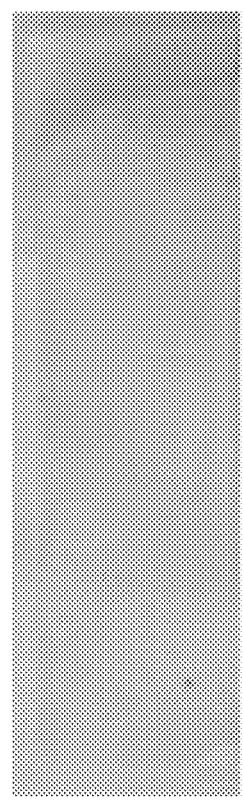
FIG. 11B shows the results of the tape test completed on the ablated second sample of the second comparative label of FIG. 11A.

FIGS. 10B and 11B show the results of this tape test for the second sample of the first comparative label and the second sample of the second comparative label, respectively. As shown in FIG. 10B, the scotch tape picked up a significant amount of debris, resulting in a near-readable duplicate of the ablated region of the second sample of the first comparative label. In contrast, as shown in FIG. 11B, little to no debris was picked up by the scotch tape affixed to the second sample of the second comparative label.

Example III

A third sample of the first comparative label and a third sample of the second comparative label are again ablated as described above to form a barcode-like pattern on the labels. The difference between the L-value of the topcoat layer and the L-value of the sacrificial layer (ΔL) is calculated for both labels. As a reference, a traditional thermal-heat-transfer (THT) printed label is made also containing a barcode-like pattern. The difference between the L-value of the white background of the THT printed label and the L-value of the black indicia is found. The results are reported in Table 1, below. The L-values are measured in accordance with ASTM E1347-06 (2015).

TABLE 1

| Product | ΔL |
|---|---|
| THT Printed Label | 84.12 |
| Comparative Label | 68.77 |
| Inventive Label | 78.10 |

Figure 12A:
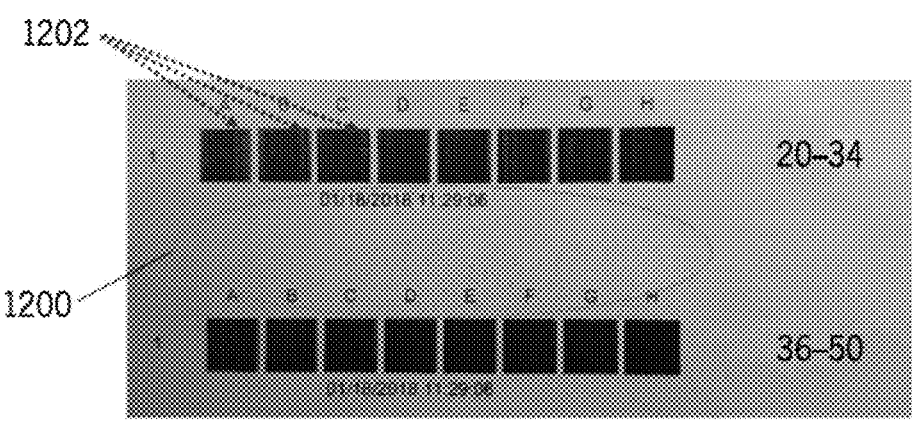
FIG. 12A shows sixteen ablated regions on a nonlimiting example of a third sample of a first comparative label using different laser power settings.
Figure 13A:
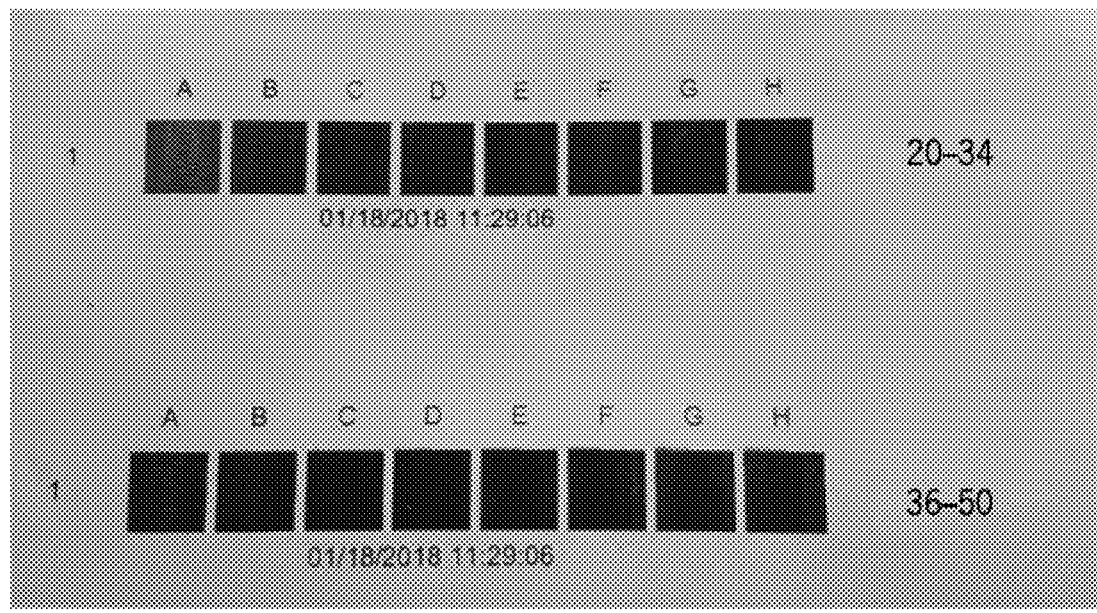
FIG. 13A shows sixteen ablated regions on a nonlimiting example of a third sample of a second comparative label in accordance with embodiments of the present disclosure using different laser power settings.

To analyze the effect of laser power settings, a series of ablations of the third sample of the first comparative label and the third sample of the second comparative label are carried out using a 50 watt $CO_2$ laser starting at 20% power and increasing to 50% in 2% increments (the ranges for each row are denoted on the right side of the respective series), resulting in a total of 16 ablated regions for each label as shown in FIGS. 12A and 13A for the third sample of the first comparative label and the third sample for the second comparative label, respectively. FIG. 12A (first comparative label) shows significant debris formation as evidenced by the dark speckling (1200) on the white background between the rows of ablated regions. In contrast, little to no debris is visible on the white background of the third sample of the second comparative label in FIG. 13A. Moreover, FIG. 12A shows that lower power settings (and particularly from 20% to 26% power) result in incomplete ablation of the target area, as indicated by the striping in ablation regions A, B and C of row 1 (identified as 1202). In contrast, the third sample of the second comparative label does not suffer incomplete ablation at any power setting used as shown in FIG. 13A.

Figure 12B:
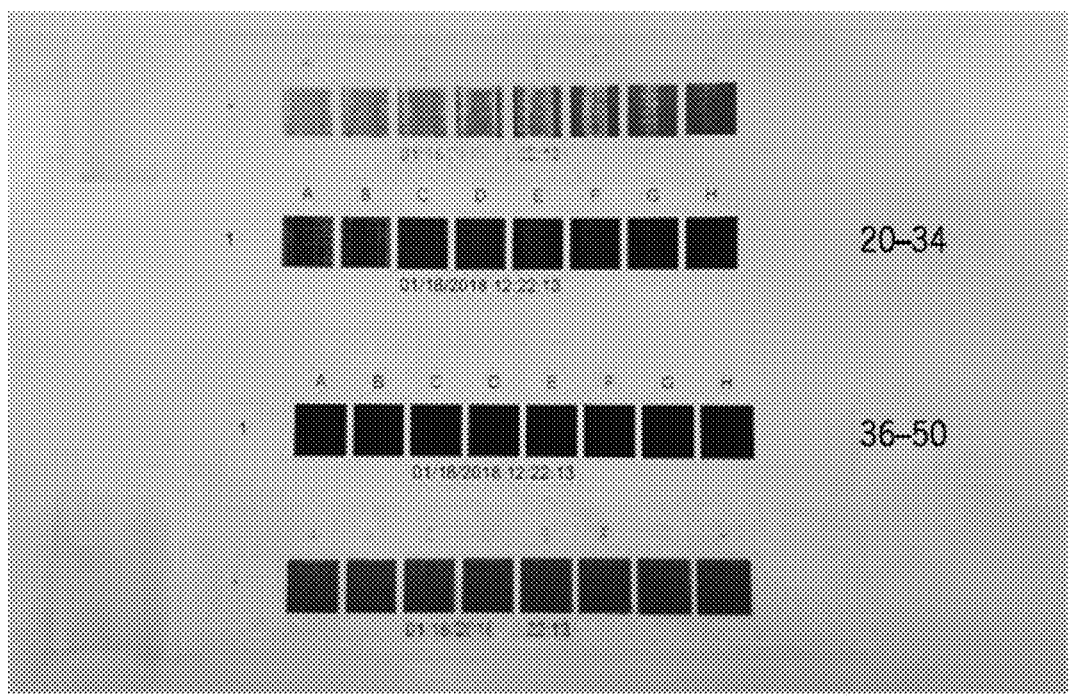
FIG. 12B shows the results of the tape test completed on the ablated label of FIG. 12A.
Figure 13B:
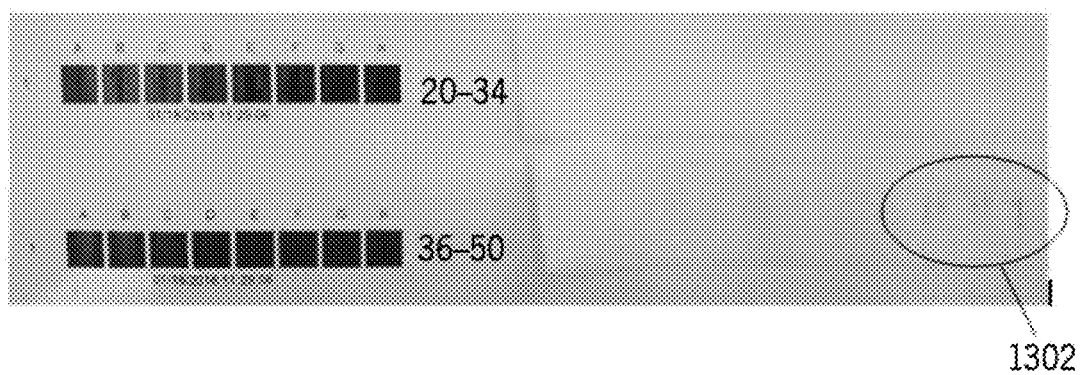
FIG. 13B shows the results of the tape test completed on the ablated label of FIG. 13A.

The tape test was also completed on the labels shown in FIGS. 12A and 13A, with the results shown in FIGS. 12B and 13B, respectively. For the third sample of the first comparative label, each ablated area is at least partially reproduced by debris on the tape, as shown in FIG. 12B. In contrast, only the areas ablated using a 48% and 50% power setting show any discernable debris (1302), as shown in FIG. 13B. Not to be bound by any particular theory, it is believed that the debris results from near complete consumption of portions of the sacrificial layer, meaning the laser's energy contacted a portion of the label's subsequent layer. A thicker sacrificial layer would likely expand the usable laser power settings.

Example IV

Figure 14:
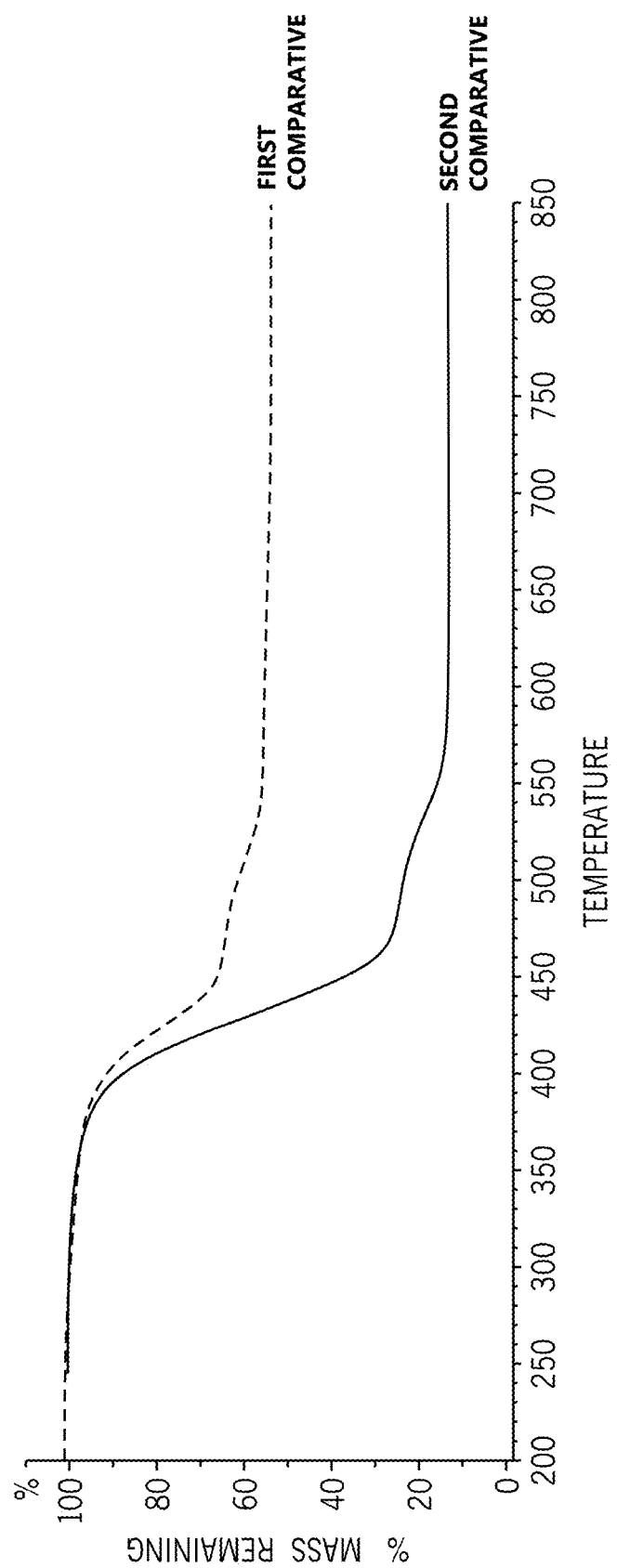
FIG. 14 is a graph showing the percent of label mass remaining as a function of temperature.

To further illustrate the more complete ablation of the second comparative label versus the first comparative label, the top two layers of each label were tested, i.e., the white and black layers of the comparative label and the topcoat and sacrificial layers of the inventive label. A thermogravimetric analysis (TGA) is completed on the two layers of the two labels. In the TGA, the temperature was increased from room temperature to 850° C. at a rate of 20° C./minute in order to simulate laser energy being absorbed. Volatilization of the polymeric binder in the layers ultimately manifests itself in mass loss from the samples. As shown in FIG. 14, the topcoat and sacrificial layers of the second comparative label volatize at a lower temperature than the white and black layers of the first comparative label and lose mass at a more accelerated rate than the white and black layers of the first comparative label, which ultimately results in lower overall residual material (e.g., debris) formed for the second comparative label.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A label comprising:
   a topcoat layer having a first color having a first L-value, the topcoat layer comprising at least one reflective pigment and a first polymeric binder; and
   a sacrificial layer having a second color having a second L-value, the sacrificial layer comprising at least one infrared (IR) absorbing material and a second polymeric binder;
   wherein the first L-value is greater than the second L-value; and
   wherein the total amount of the at least one reflective pigment is from 40 wt % to 80 wt %, based on the weight of the topcoat layer.

2. The label of claim 1, wherein the topcoat layer has a first facial surface and a second facial surface and the sacrificial layer has a first facial surface and a second facial surface, wherein the second facial surface of the topcoat layer is at least partially coupled to the first facial surface of the sacrificial layer.

3. The label of claim 1, wherein the at least one reflective pigment is titanium dioxide.

4. The label of claim 1, wherein the at least one reflective pigment has a particle size of greater than or equal to 4 Hegman units, as measured in accordance with ASTM D1210-05.

5. The label of claim 1, wherein the topcoat layer is substantially free from organic fillers.

6. The label of claim 1, wherein the first color has an L-value from 80 to 100 and the second color has an L-value from less than or equal to 30, as measured in accordance with ASTM E1347-06 (2015).

7. The label of claim 1, wherein the at least one IR absorbing material is carbon black.

8. The label of claim 1, wherein the sacrificial layer is substantially free from inorganic fillers and organic fillers.

9. The label of claim 1, wherein the sacrificial layer are substantially free from mineral filler and metal oxide fillers.

10. The label of claim 1, wherein the at least one IR absorbing material and the second polymeric binder of the sacrificial layer are mixed.

11. The label of claim 1, wherein the first polymeric binder and the second polymer binder are composed of the same material.

12. The label of claim 1, wherein the difference between the first L-value and the second L-value is greater than 50.

13. The label of claim 1, wherein the total residual content after subjecting the topcoat layer and sacrificial layer to thermogravimetric analysis (from room temperature to 850° C. at a rate of 20° C./minute) is from 10 wt % to 32 wt %.

14. The label of claim 1, wherein the topcoat layer has a first thickness, the sacrificial layer has a second thickness, and the second thickness is greater than the first thickness.

15. The label of claim 1 further comprising at least one inorganic filler in the topcoat layer and wherein the total residual content after subjecting the topcoat layer and sacrificial layer to thermogravimetric analysis (from room temperature to 850° C. at a rate of 20° C./minute) is from 10 wt % to 32 wt %.

16. The label of claim 1 further comprising at least one of a film layer, an adhesive layer, and a liner.

17. A liner in the form of a roll carrying a plurality of labels according to claim 1.

18. A substrate bearing a label of claim 1.

19. A method for ablating the label of claim 1, the method comprising:
   irradiating at least one target region on the topcoat layer with a laser beam; and
   removing the topcoat layer and at least a portion of the sacrificial layer in the at least one target region.

20. The method of claim 19, wherein the topcoat layer has a first facial surface and a second facial surface and the sacrificial layer has a first facial surface and a second facial surface, and the second facial surface of the topcoat layer is coupled to the first facial surface of the sacrificial layer.

21. The method of claim 19, wherein the step of irradiating includes irradiating the at least one target region on the topcoat layer and allowing at least a portion of the energy from the laser beam to irradiate the sacrificial layer at a region corresponding to the target region.

22. The method of claim 21, wherein the step of removing the topcoat layer and at least a portion of the sacrificial layer includes allowing the sacrificial layer to expand and blow out the topcoat layer.

23. A label comprising:
   a topcoat layer having (1) a first color having a first L-value and (2) a first facial surface and a second facial surface, the topcoat layer comprising at least one reflective pigment and a first polymeric binder;
   a sacrificial layer having (1) a second color having a second L-value and (2) a first facial surface and a second facial surface wherein the first facial surface is in contact with the second facial surface of the topcoat layer, the sacrificial layer comprising at least one infrared (IR) absorbing material and a second polymeric binder;
   a film layer having a first facial surface and a second facial surface, wherein the first facial surface is in contact with the second facial surface of the sacrificial layer;
   an adhesive layer having a first facial surface and a second facial surface, wherein the first facial surface is in contact with the second facial surface of the film layer; and
   optionally, a liner having a first facial surface and a second facial surface, wherein the first facial surface is in contact with the second facial surface of the adhesive layer,
   wherein the first L-value is greater than the second L-value, and
   wherein the total amount of the at least one reflective pigment is from 40 wt % to 80 wt %, based on the weight of the topcoat layer.

* * * * *